United States Patent [19]
Dailliez et al.

[11] Patent Number: 5,622,669
[45] Date of Patent: Apr. 22, 1997

[54] PROCESS AND APPARATUS FOR THE VULCANIZING OF TIRES

[75] Inventors: Olivier Dailliez, Charbonnieres-les-Bains; Daniel Laurent, Meylan; David Myatt, Chateaugay, all of France

[73] Assignee: Sedepro, Paris, France

[21] Appl. No.: 286,284

[22] Filed: Aug. 5, 1994

[30] Foreign Application Priority Data

Aug. 9, 1993 [FR] France ................... 93 09849

[51] Int. Cl.⁶ ..................... B29C 35/00; B29C 35/08
[52] U.S. Cl. ................... 264/403; 264/486; 264/496; 264/297.5; 264/297.6; 264/315; 264/326; 264/DIG. 46; 264/DIG. 65; 425/34.3; 425/38; 425/41; 425/47; 425/174.8 R; 425/453; 425/DIG. 13; 425/DIG. 39

[58] Field of Search .................. 425/34.1, 34.3, 425/38, 41, 453, 454, 47, 174.8 R, DIG. 13, DIG. 39; 264/315, 326, 297.5, 297.6, DIG. 46, DIG. 65, 403, 402, 486, 496, 494

[56] References Cited

U.S. PATENT DOCUMENTS

| | | | |
|---|---|---|---|
| 1,540,219 | 6/1925 | Myers | 425/34.3 |
| 1,566,500 | 12/1925 | Northrup | 264/DIG. 46 |
| 1,682,620 | 8/1928 | Ledwinka | |
| 2,738,406 | 3/1956 | Zaleski | 264/DIG. 46 |
| 3,054,141 | 9/1962 | Hammesfahr | 264/DIG. 46 |
| 3,477,100 | 11/1969 | Pech et al. | |
| 3,712,769 | 1/1973 | Cimprich | 264/DIG. 65 |
| 4,699,578 | 10/1987 | Sumner et al. | 264/326 |
| 4,728,274 | 3/1988 | Siegenthaler | |
| 4,895,692 | 1/1990 | Laurent et al. | |
| 5,384,084 | 1/1995 | Siegenthaler | 264/DIG. 65 |

FOREIGN PATENT DOCUMENTS

| | | |
|---|---|---|
| A2088002 | 1/1972 | France . |
| 59-114042 | 6/1984 | Japan . |
| 5-147046 | 6/1993 | Japan . |
| A374482 | 2/1964 | Switzerland . |

OTHER PUBLICATIONS

Patent Abstracts of Japan, vol. 8, No. 267 (M–343) (1704) Jul. 12, 1984 & JP-A-59 138 431 (Toukai Gomu K.K.K.).

*Primary Examiner*—Mathieu D. Vargot
*Attorney, Agent, or Firm*—Brumbaugh, Graves, Donohue & Raymond

[57] ABSTRACT

A tire vulcanization apparatus in which an encaser 3 makes it possible to introduce a tire into a mold 1 and, by means of inductors 42, transfers to the mold heat energy necessary for vulcanization and in which a chamber 5 receives several molds 1 and makes it possible to maintain each mold insulated from the environment in order to limit heat losses during the time necessary for the vulcanization.

20 Claims, 1 Drawing Sheet

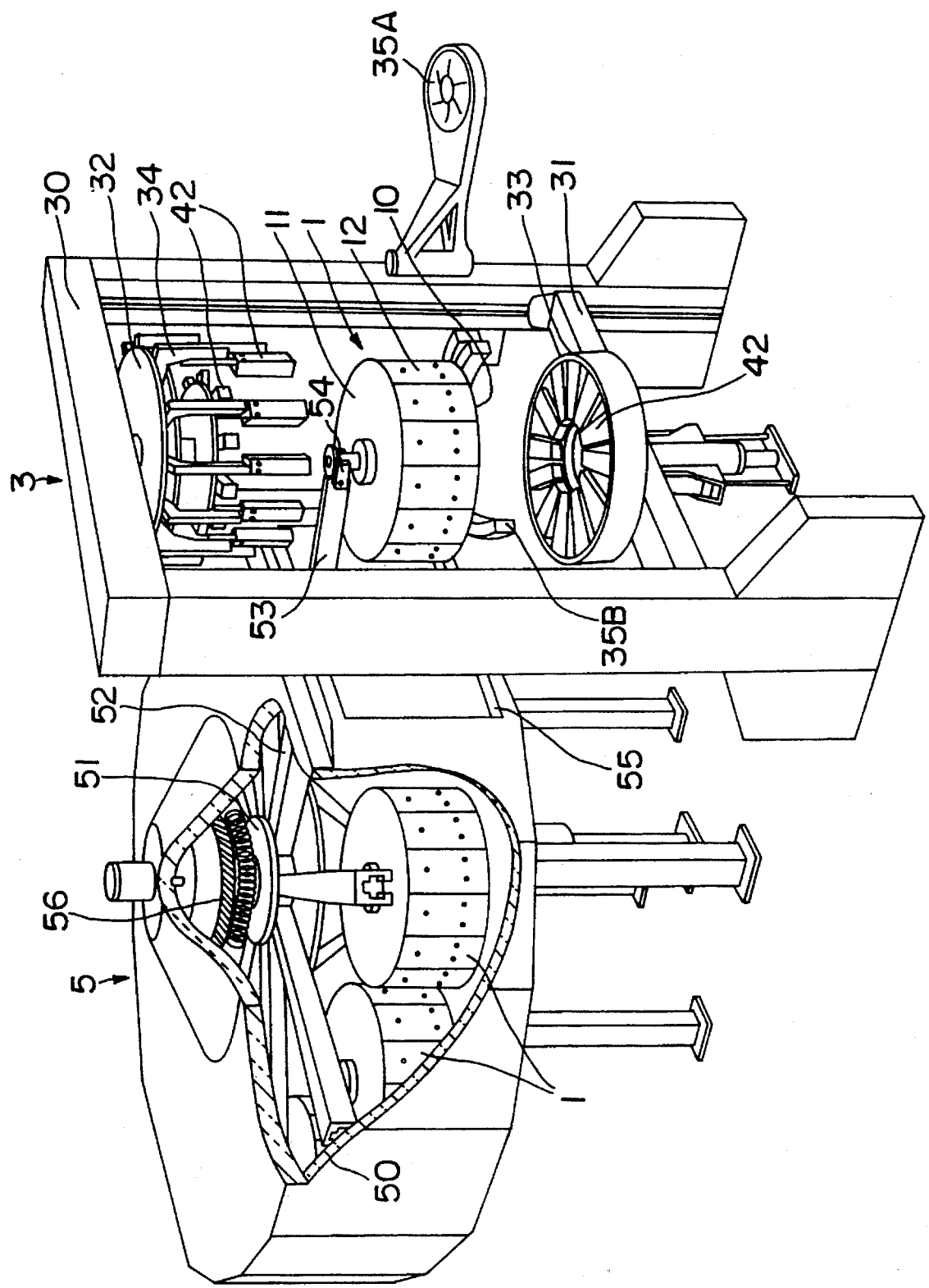

PROCESS AND APPARATUS FOR THE VULCANIZING OF TIRES

BACKGROUND OF THE INVENTION

The present invention relates to the vulcanizing of tires. In order to assure the vulcanizing of tires, a vulcanization press is generally used. This apparatus is capable of assuring the kinematics of a mold and of contributing the heat necessary to assure the vulcanization reaction. The vulcanization press comprises the gripping means necessary for the grasping of the mold and the necessary mechanisms for opening and closing the mold. Except during the phases of the loading of a raw tire and the unloading of a vulcanized tire the mechanisms intended to assure the kinematics of the mold remain unused.

Vulcanization is a relatively slow procedure which requires that the tire be maintained in the closed mold for a period of time which varies between a few minutes and several hours depending on the size of the tire. The mechanisms of the press, which are not used for the entire time of the vulcanization process, may represent an important part of the cost of a press. As a result, there is a poor utilization of the investments.

In order to improve the profitability of the investments, the prior art already employs vulcanization systems which can be called "collective". An encaser assures the loading and unloading of a tire into and out of a mold. When this loading/unloading operation is completed, the mold leaves the encaser and remains waiting, for instance in a carousel where it is subjected to heating means in the same way as in an individual press. One example of such an installation is described in U.S. Pat. No. 3,477,100. The use of such systems is to be sure of greater interest the longer the vulcanization time.

The present invention is directed at improving these systems in which the mold does not remain attached to a press for the entire time of the vulcanization. In fact, while these systems assure a better use of the mechanisms which make it possible to provide the kinematics of the molds, they raise the problem of assuring the transfer of the heat energy for the entire time of the vulcanization. In particular, when the molds move during the vulcanization, this makes the connection which permits feeding the fluid transporting the vulcanization energy towards each mold much more complicated. In any case, the improvement in the profitability of the investment is not as great as could have been expected. For this reason, the use of such vulcanization systems has remained very marginal.

The present invention is based on the observation that it is possible to take advantage of the large heat capacity of tire molds in order to cause the transfer to the mold of the heat necessary for the vulcanization, that it is possible to effect an intense transfer of heat within a very short period of time, and that it is possible to permit the heat to pass progressively from the mold to the tire.

SUMMARY OF THE INVENTION

The tire vulcanization process proposed by the present invention comprises the following operations:
introducing each tire into a mold of substantial heat capacity and imparting to the mold, for a short period of time, at least a part of the vulcanization energy which is to be communicated to the tire from the outside thereof by an intense heat transfer,
terminating the said heat transfer and then maintaining the tire in the mold after said short period of time for the time necessary in order for the vulcanization reaction to take place,
removing the tire from its mold.

The total time of vulcanization is determined by a vulcanization law which the person skilled in the art has no difficulty in establishing and which is expressed by a period of time during which the tire to be vulcanized is maintained at a given temperature level, generally a constant level, while maintaining it under pressure so as to avoid the presence of gas bubbles within the rubber and so as to assure a perfect molding of the final manufacturing shape. The said necessary time is determined by the difference between the total time and said short period of time. Within the meaning of the present invention, the said short period of time is at least less than one half of the total time. The application of the present invention is of greater interest the greater the time necessary beyond said short period of time.

It is known that, in order to vulcanize a tire, it is desirable to impart heat to it from both the outside and the inside. For the contribution from the outside, this is effected by heating the mold and, for the contribution from the inside, a heated pressurization fluid, for instance, is used, generally contained within a bladder. The total vulcanization energy which is to be imparted to the tire via the mold is preferably imparted to it at said heating station.

The method of vulcanization thus proposed leads to transferring to the mold a very large amount of heat for a very short period of time. In order not to exceed the desired reference temperature for the vulcanization of the tire, heat is preferably contributed from the side of the mold opposite the molding surfaces. During the transfer of energy, certain parts of the mold, particularly those to which the vulcanization energy has been imparted, may be heated to a temperature far greater than the reference temperature. It has been found that it is possible to obtain such an operation of the installation that the heat imparted to the mold passes gradually to the tire, which is heated entirely homogeneously and uniformly, all points of the tire reaching a temperature which remains within narrow tolerances around the reference temperature.

In a preferred variant application of the process of the invention, at the end of the heat transfer for a given tire, the mold containing it is moved and placed in a waiting space for the time necessary for the vulcanization reaction to take place and, before the vulcanization reaction is completed for said given tire, the heat transfer and the other operations indicated are commenced for another tire.

From another aspect, the invention proposes a tire vulcanization apparatus which comprises a station which makes it possible to support a tire introduced into a mold, the said station comprising means which make it possible to transfer to the mold containing said tire at least part of the heat energy necessary for the vulcanization which is to be imparted to the tire from the outside thereof, and which comprises at least one annexed chamber which makes it possible to maintain the tire and its mold insulated from the environment so as to limit the heat losses during the time necessary for the vulcanization.

Thus, the apparatus for the vulcanization of tires introduced into a mold comprises a centralized heating station having means which can be coupled to the mold when the latter remains in the said heating station for the time necessary in order to transfer to it the heat energy which is to be returned to the tire, and it comprises means making it possible to move the mold, uncoupled from the said energy transfer means, towards an annexed waiting chamber in order to complete the vulcanization reaction therein, at least in part under the effect of the heat stored by the mold at said heating station.

Various embodiments are possible in order to assure the transfer of the vulcanization energy. The following description presents an apparatus which uses magnetic induction to heat a mold. In this case, it is necessary to use a mold a sufficient portion of which is of magnetic metallic material in order to be able to produce eddy currents in the mold.

One could also contemplate other techniques for the heating of the mold, such as, for instance, contact heating or heating by infra-red radiation. It goes without saying that the invention is in no way limited to this embodiment, which is given solely in order to explain the principle of the invention.

In order to produce a machine which is as compact as possible, the introduction into a mold and the imparting of energy are effected at the same place. In this case, the equipment making it possible to impart the vulcanization energy to the mold is integrated in the encaser which assures the kinematics necessary so that the mold can be opened and closed again around the tire. The vulcanization energy is thus imparted to the mold during its stay in the encaser. It is even possible to have the transfer of energy towards the mold start before the mold is completely closed.

Due to this invention, it is possible to increase the number of functions performed by the central installation and considerably to simplify the rest of the vulcanization installation which does not serve to transmit heat to the tire via the mold which surrounds it on the outside.

DESCRIPTION OF THE DRAWING

The accompanying drawing shows a perspective view of a vulcanization apparatus in accordance with the invention.

DESCRIPTION OF THE PREFERRED EMBODIMENTS

The vulcanization apparatus includes a chamber 5 housing eight molds 1 which retain the tires for the time necessary for the vulcanization. Each mold includes a lower shell 10, an upper shell 11, and a ring of sectors 12. There may be additional metal parts which are directly connected to the said shells and the said sectors, produced furthermore by any method whatsoever, but the invention is not concerned with these details. The molds 1 are supported within the chamber by a rotary carousel 51 capable of receiving the molds at different places arranged in a circle around the entire carousel. In order to support the molds, the carousel has radial beams 52; each of the beams 52 contains a slide 53 provided at its end with a clamp 54 making it possible to grasp a mold 1.

The wall 50 of the chamber 5 is provided with an insulator which makes it possible to limit heat losses. A resistor 56 incorporated in the chamber 5 makes it possible to maintain the temperature prevailing within the chamber at a constant level despite the heat losses through the walls of the chamber and despite the heat losses caused by the opening of the door 55 for the time necessary in order to remove and/or introduce a mold 1 within the latter. Even if occasionally a mold is introduced into the chamber 5 at (or develops towards) a temperature less than the temperature prevailing in said chamber, there will result therefrom a thermal state which cannot be considered a contribution of energy selectively to a given mold. There is moreover no regulation connecting the control of said resistor 56 to the temperature or to any parameter noted on a mold during its stay in the chamber 5.

The reference numeral 3 designates the device which makes it possible to assure the kinematics of the mold, referred to as an encaser. It comprises an upper beam 30 from which there is suspended an upper plate 32, and a lower beam 31 bearing a lower plate 33. The lower beam 31 is movable with respect to the upper beam 30. The two beams 30 and 31 remain parallel to each other at all times.

Each mold 1 has its own internal equipment firmly secured to the lower shell, comprising a bladder pressurized by a fluid, for instance nitrogen. The lower plate 33 contains the means for the driving of said internal equipment, making it possible to unfold the bladder within the tire and to retract it from the tire.

Lateral arms 34 are arranged in a circle around the entire upper plate 32. They extend perpendicular to it and can be moved away or together radially. The movement of the lateral arms 34 makes it possible to assure the retraction or bringing together of the sectors of the mold. There are as many lateral arms 34 as there are sectors on the mold. Each of the plates 32, 33 contains means (not shown) enabling it to be mounted to one of the lateral shells of the mold. The ends of the lateral arms 34 can be locked and unlocked on the back of each of the sectors of the mold on the side opposite the molding surfaces. The plates 32 and 33 and each of the lateral arms 34 are equipped with inductors 42 which make it possible to effect the transfer of heat energy to the mold by inductive coupling.

The accompanying drawing shows the vulcanization apparatus at a moment during its operating cycle which corresponds either to the introduction of a mold equipped with a tire into the chamber 5 or the removal of a mold from the same chamber 5 at the end of vulcanization. In both cases, the mold is closed and contains a tire.

The operation of the apparatus is as follows: Let us assume that a mold 1 has just been removed from the chamber 5. The lower beam 31 rises until the lower plate 33 strikes the mold 1 and is locked on the lower shell 10. The clamp 54 releases the mold 1 and the slide 53 is retracted into the chamber 5. The lower beam 31 continues to rise until the mold 1 strikes the upper plate 32. The latter is locked on the upper shell 11. Thereupon, all the lateral arms 34 approach the mold and are locked on the corresponding sectors 12.

It may be pointed out that a self-locking mold of the type described in U.S. Pat. No. 4,895,692 can be used. This imposes a specific opening and closing kinematics. The reader should refer to said patent in order to note all the details thereof.

At this stage, the mold 1 is entirely firmly attached to the encaser 3. The latter will be able to open the mold 1 in order to remove the vulcanized tire after the pressure prevailing in the inner cavity of the tire has been reduced (contraction of the bladder). The lateral arms 34 move back, each carrying a sector with it. The movable beam 31 can descend to a level which permits a bracket 35B to remove the vulcanized tire. Thereupon, a bracket 35A can introduce a raw tire onto the lower plate 33 and the cycle starts again, namely: closing of the mold and unfolding of the bladder within the tire, heating of the mold, taking over of the mold by a slide 53 and introduction of the mold into the chamber 5. The encaser is then available to handle the next tire arriving at the end of the stay in the chamber 5. The time of stay of each mold in the chamber 5 depends on the time necessary for the vulcanization reaction to take place.

The heat energy can be imparted to the mold not only when it contains the tire to be vulcanized but also in advance, as soon as the sectors and the shells are handled by the encaser, which decreases the time of stay in the encaser of the tire the vulcanization of which is going to start. The amount of energy received by the mold is controlled by a regulation based on the measurement of the temperature at a given point of the mold and on the experimental knowledge of the thermal behavior of the mold used. This is heating by accumulation. The very strong thermal inertia of the mold causes this system of vulcanization to be particularly stable and tolerant.

We may furthermore point out that it is even possible to introduce into the chamber 5 tires of different size the vulcanization laws of which are different. In such case, one can select a curing of constant time, which is the same for all the molds which are introduced in succession therein. It is then necessary to adjust the temperature of the curing, which is done by adjusting the temperature to which the mold is heated by the inductors.

It has been explained above that, during the said short period of time corresponding to the transfer of energy to the mold, the temperature of a mold is not uniform. Of course, the temperature adjustment referred to above is a different concept from the non-uniformity of temperature which is characteristic of the phase of intense heat transfer. The mention herein of adjusting the temperature of the mold at a different level means adjusting a temperature at a given place on each mold, that means a temperature which can be gauged by a sensor placed on a given place, for instance on the outer surface of the mold, for example on the back of a sector on the side opposite the molding surface.

One can also choose to heat all the molds always to the same temperature. It is then necessary to adjust the vulcanization time, which is done by withdrawing the molds 1 from the chamber 5 in suitable order, and not simply in the order in which they were introduced into it.

It is of course possible to use a combination of the two above methods, namely to adopt a different temperature for each type of mold and at the same time adjust the time of stay within the chamber 5 differently for each type of mold.

It may be desirable to continue to add heat from the inside of the tire while the mold is in the chamber 5. Different solutions can be adopted. For example, one can use a heat-exchange fluid and the internal equipment can comprise a system for the heating and stirring of charge of such fluid. In such case, a mold center equipment of the bladder type can be used such as described in U.S. Pat. No. 4,728,274, with suitable electric connecting means connected to each mold during its stay in the chamber 5.

We claim:

1. A tire vulcanization apparatus comprising a heating and encasing station supporting a tire to be introduced into a mold assembled of mold parts, said station including mold closing means which are moved and coupled to said mold parts for enclosing an uncured tire in a mold, heating means at the heating and encasing station for the transfer to the outside of the mold at the station at least part of the heat energy necessary for the vulcanization which is to be imparted to the tire, a chamber for accommodating more than one mold and to which each mold is delivered for maintaining the tire in its mold insulated from the environment in order to limit the heat losses during the time necessary for the vulcanization and means for transferring the mold with the tire encased therein from the heating and encasing station to the chamber after the uncoupling of the mold closing means.

2. An apparatus according to claim 1 including a mold made, at least in part, of magnetic metal material and in which the heating means at said station includes electric inductors producing eddy currents in the mold in order to assure the transfer of heat energy.

3. An apparatus according to claim 2, in which during the transfer of energy the inductors are arranged on the outside of the mold on the side opposite the molding surfaces.

4. An apparatus according to claim 1, in which the said chamber comprises a rotary carousel for receiving the molds and carrying them arranged in a circle around the carousel.

5. A method of vulcanizing tires comprising:

a heat transfer step which includes introducing a given tire into a mold of substantial heat capacity and imparting to the mold at a heating and encasing station, for a short period of time, at least a part of the vulcanization energy which is imparted to the tire from the outside of the mold by an intense heat transfer and terminating the heat transfer to the mold after said short period of time, moving the mold containing said tire from the heating and encasing station into a chamber which accommodates a plurality of molds, maintaining the tire in its mold insulated by the chamber from the environment in order to limit the heat losses during the time necessary for vulcanization, processing the heat transfer step for a subsequent tire at said heating and encasing station while maintaining the said given tire in the mold in the chamber for the time necessary in order for the vulcanization reaction to be completed, removing a tire from the chamber to a heating and encasing station and then from its mold at the end of the vulcanization reaction.

6. A method according to claim 5, used to vulcanize during successive sequences tires of different dimensions, wherein the time of stay in the chamber is identical for all the tires, the vulcanization temperature being adjusted as a function of the size of each tire.

7. A method according to claim 5, used to vulcanize during successive sequences tires of different dimensions, wherein the time of stay in the chamber is adjusted as a function of the size of each tire, the vulcanization temperature being identical for all the tires.

8. A method according to claim 5, wherein the heat transfer step commences before the complete closing of the mold.

9. An apparatus for the vulcanizing of tires introduced into a mold assembled of mold parts comprising an encasing and heating station having a centralized heating means and means which can be coupled to and uncoupled from the mold parts to open and close the mold in said encasing and heating station, said heating means operating for the time necessary in order to transfer to the outside of the mold the heat energy to initiate vulcanization of the tire, and means for displacing the mold, uncoupled from said coupling and heating means, from the encasing and heating station to a chamber having room for accommodating more than one mold in order to complete the vulcanization reaction at least in part under the effect of the heat stored in the mold by the heat energy supplied at the said encasing and heating station, said mold displacing means returning a tire to an encasing and heating station after its period in the chamber for the removal of the tire from the mold.

10. An apparatus according to claim 9, including a mold made at least in part of magnetic metal material wherein the said station comprises electric inductors producing eddy currents in the mold in order to assure the transfer of heat energy.

11. An apparatus according to claim 9 in which the said chamber comprises a rotary carousel capable of receiving the molds and carrying them arranged in a circle all around the carousel.

12. An apparatus for vulcanizing tires in molds comprising a chamber accommodating a plurality of molds containing tires for a time necessary to complete vulcanization, an encaser adjacent the chamber for closing tire molds before vulcanization and for opening the tire molds after vulcanization, said encaser including heating elements for imparting to the tire at least part of the heat necessary for vulcanization before the mold is transferred to the chamber and mold coupling means movable toward and away from the mold to open and close the mold, and means for transporting molds from the encaser to the chamber and from the chamber back to the encaser for opening the mold.

13. An apparatus as set for in claim 12 in which the chamber is a rotary carousel for accommodating a plurality of molds arranged in a circle within the chamber.

14. An apparatus as set forth in claim 13 in which said mold transporting means includes a plurality of radially movable mold supports within the carousel for transporting each mold to and from the chamber.

15. An apparatus for the vulcanizing of tires introduced into a mold made at least in part of magnetic metal material comprising an encaser for introducing a tire into a mold or removing it from a mold, said encaser including gripping means which can be coupled to the mold for opening and closing the mold, electric inductors carried by said gripping means to transfer to the outside of the mold at least part of the energy necessary for the vulcanization of the tire by producing eddy currents in the mold in order to assure the transfer of heat energy, an insulated, vulcanizing chamber which accommodates more than one mold for the final vulcanization heating and means displacing the heated mold, uncoupled from said gripping means, to the chamber to complete the vulcanization reaction at least in part under the effective heat stored in the mold and means conveying the molds in the vulcanization chamber to permit the encasement and heating of another uncured tire in a mold.

16. An apparatus as set forth in claim 15 in which the mold is a sector mold having a predetermined number of sectors and the encaser includes a plurality of lateral arms to which the electric inductors are mounted for imparting heat to the mold and means carried by the lateral arms to permit the arms to be locked and unlocked on the mold sectors for opening and closing the mold.

17. An apparatus for vulcanizing tires in molds comprising an insulated vulcanizing chamber which accommodates more than one mold for the final vulcanization heating of a tire encased in a mold, an encaser having gripping means movable toward and away from the mold to couple with and uncouple from mold parts for closing the mold parts to encase an unvulcanized tire in a mold, heaters carried by the movable gripping means and moving with them toward the mold for supplying heat to the outer surface of the mold to at least partially vulcanize the encased tire, means for transferring the heated mold to the vulcanizing chamber when the gripping means and heaters are moved away from the mold and means for conveying the heated mold in the chamber while other heated molds are loaded therein.

18. A tire vulcanizing apparatus as set forth in claim 17 in which said mold transferring means returns the mold containing a vulcanized tire from the chamber to the encaser for opening the mold to remove the vulcanized tire from the mold.

19. A method for vulcanizing tires in molds comprising encasing a tire in a mold using movable gripping means which couple with mold parts for closing the mold parts, heating the outside of the mold by heaters carried by the gripping means, the gripping means carrying the heaters toward the outside of the mold for supplying vulcanizing heat to the unvulcanized tire within the mold to at least partially vulcanize the encased tire, transferring the heated mold to an insulated vulcanizing chamber which accommodates more than one mold, and conveying the heated mold in the chamber while other heated molds are loaded therein.

20. A method as set forth in claim 19 including returning a mold containing a vulcanized tire from the chamber to the gripping means to remove the vulcanized tire from the mold.

* * * * *